June 13, 1933.  H. E. SMITH ET AL  1,913,519
LIGHT PROJECTOR
Filed Jan. 25, 1933  3 Sheets-Sheet 3
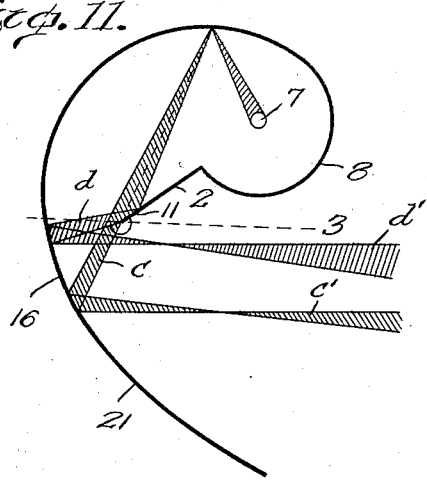
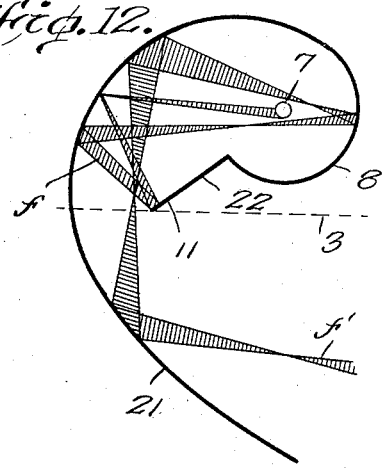
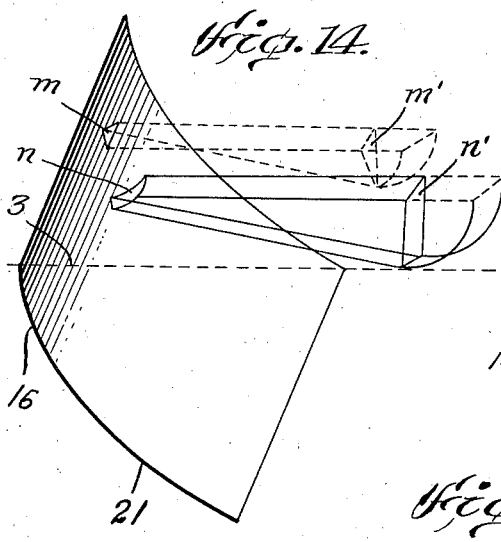
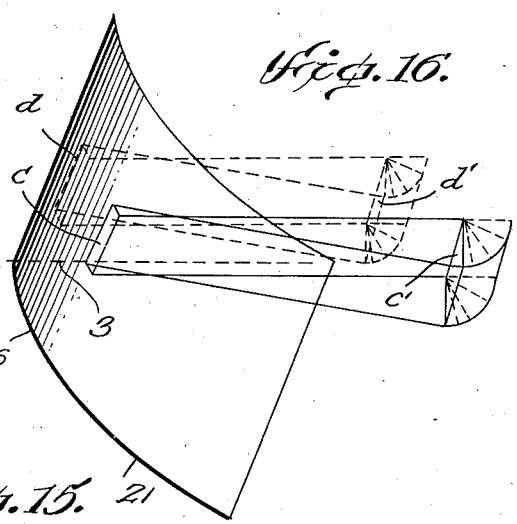
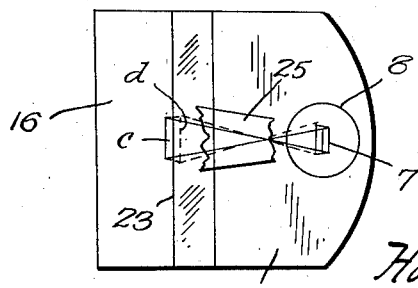
Inventors
Harold E. Smith
Harry E. Buffington Patented June 13, 1933

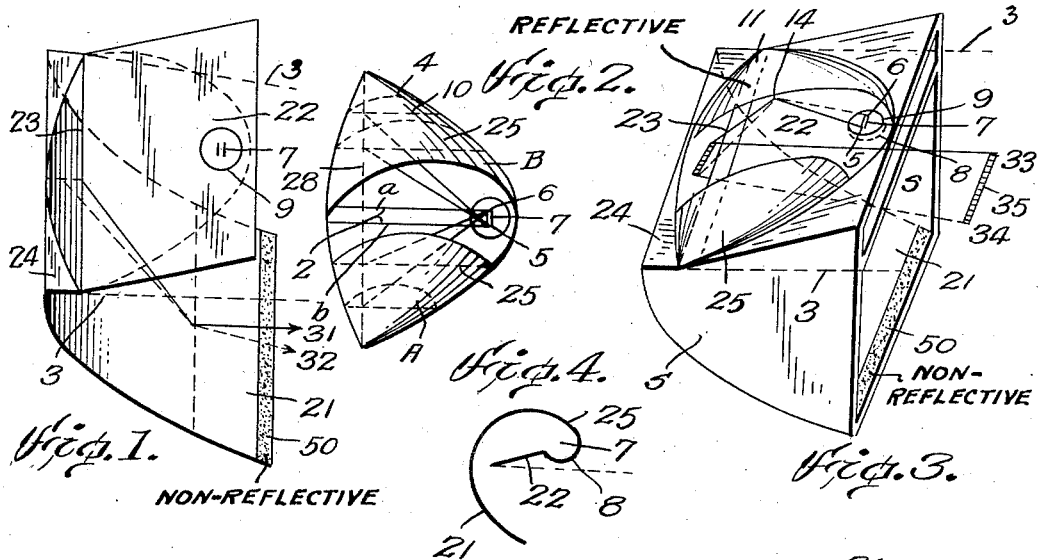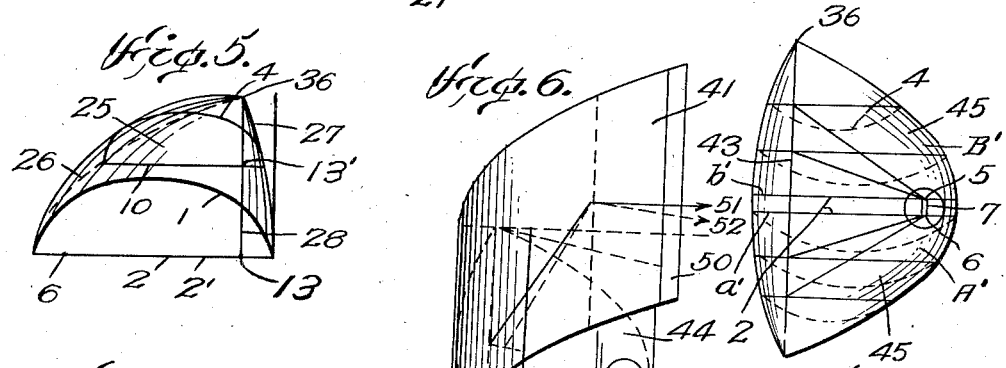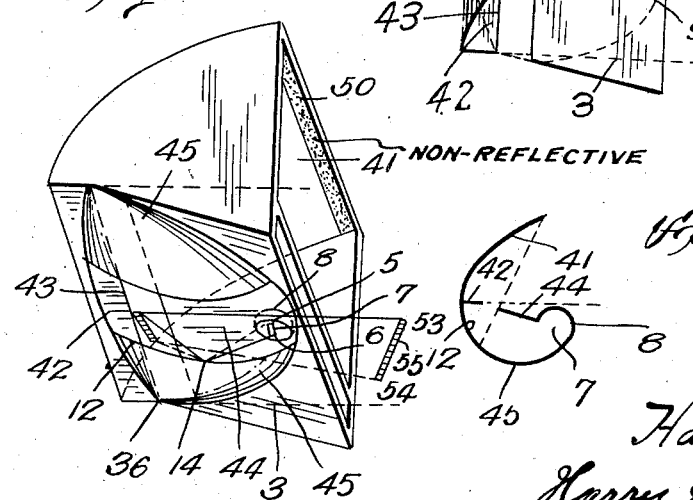

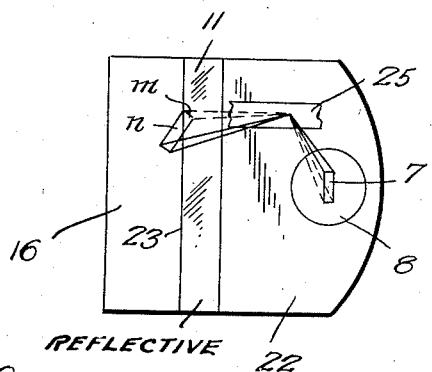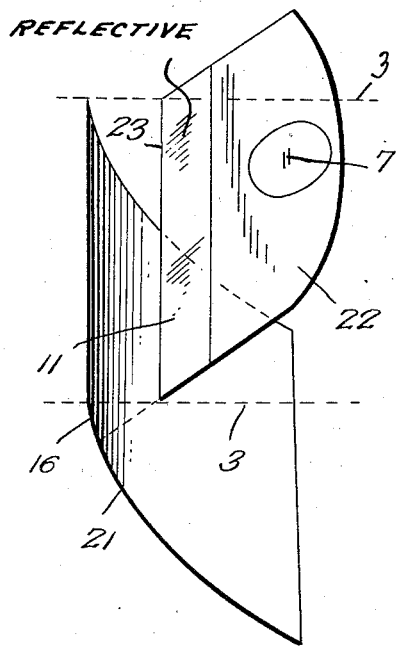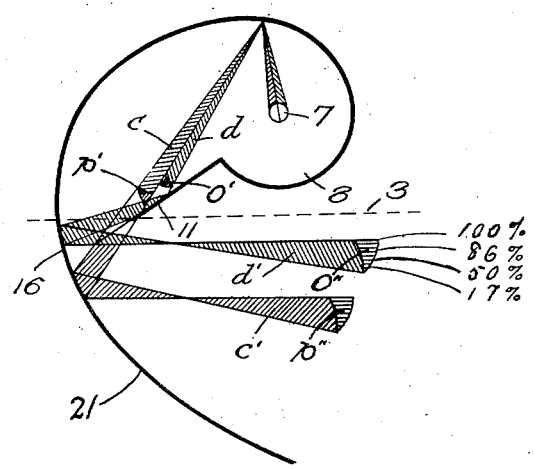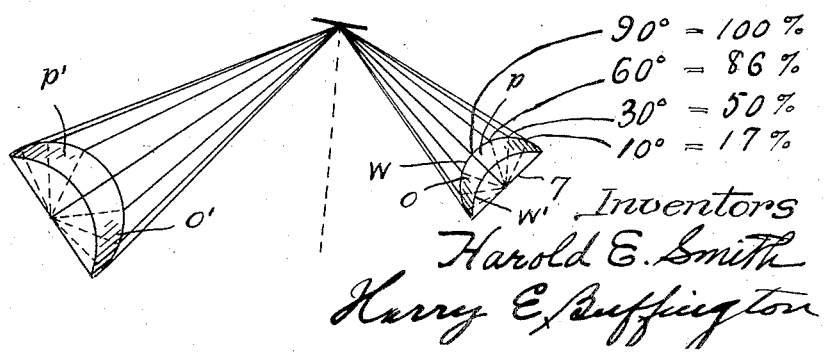

1,913,519

UNITED STATES PATENT OFFICE

HAROLD E. SMITH AND HARRY E. BUFFINGTON, OF LYKENS, PENNSYLVANIA

LIGHT PROJECTOR

Application filed January 25, 1933. Serial No. 653,378.

The present improvements relate to selective, arbitrary fixed control of light in its distribution, direction and intensity, and will be exemplified in their application to headlights.

The present application is a continuation in part of our copending application, Serial No. 508,430, filed January 13th, 1931. The figures in the case are identical with Figs. 1 to 8 and 15 of the prior case, except for the baffle plate, which is made reflective in the region of the trimming edge, and shown in Figs. 10 to 18 of this application.

The object of the invention is to produce a light field especially suited for automobile headlights, wherein the light rays of the greater intensity illuminate that part of the roadway furthest from the car without glare rays above the horizontal.

A primary object, among others, of the present improvements, is to provide a light-projecting device which prevents glare and at the same time does not sacrifice or impair the efficiency of the illumination.

Another object is to provide an illuminating device having a novel arrangement of reflecting surfaces in combination with a light source. A further object is to provide a device of the aforementioned character wherein the intensity, direction, spread, etc., of the rays may be predetermined and controlled.

A still further object is to provide an improved shield or baffle in combination with selected reflectors interrelated thereto, for compelling the projection of rays from a light source in a prescribed manner.

Another object of the improvements is to provide means to pass substantially the whole of the solid angle of emitted rays convergingly to a single line, approximately parallel with the light source.

Other primary objects of the invention are to provide a headlight which has a positive prevention of glare rays to other users of the highway; which permits the employment of a relatively high candle-power light source without producing corresponding increase of glare; which permits a smooth continuous surface in the structure of the ovoid reflector element so as to facilitate economic manufacture; which controls the width spread of the projected beam by the properties of the ultimate reflector.

A further object is to substantially double the intensity of those rays projected in the horizontal, and in the field of illumination immediately below the horizontal so as to render vehicles, persons, and objects at a relatively far distance on the roadway clearly discernible.

A further object is to increase the efficiency of that class of headlights in which preparatory reflectors are used to reflect light images to and over a baffle plate to impinge an additional cylindrical reflector for ultimate reflection.

A further object is to prevent glare rays in light projectors, regardless of any non-precision or inaccuracy of structure, or of correlation, or of placements of the elements which precede the ultimate reflector, without affecting the intensity of composite beam.

Fig. 1 is a perspective view of a portion of the improvements, illustrating the cylindrical reflector and the baffle correlation.

Fig. 2 is a top view of another portion of the improvements, illustrating the ovoid reflector, with central section removed, showing its correlation with the light source.

Fig. 3 is a perspective view of one embodiment of the improvements, a portion of ovoid reflector broken away, and some parts diagrammatically illustrated, also the paths of certain rays and the new reflective region of the baffle plate.

Fig. 4 is a diagrammatic representation of the correlation of the elements of Fig. 3.

Fig. 5 illustrates a projection in the second quadrant of the method of generating the left half of the ovoid reflector, shown in Figs. 2 and 3.

Fig. 6 is a perspective view of a portion of a modified form of the improvements illustrating the paths of certain rays.

Fig. 7 is a bottom plan view of the ovoid reflector associated with a light source.

Fig. 8 is a perspective view illustrating an inverted embodiment of the improvements.

Fig. 9 is a diagrammatic representation of the correlation of the elements of the inverted type.

Fig. 10 is a perspective view of the baffle plate improvement, showing the reflective portion.

Fig. 11 is a vertical section of the apparatus through the light source diagrammatically illustrating the paths of intercepted and the nonintercepted parts of the image, when impingement is in the forward part of ovoid.

Fig. 12 is the same as Fig. 11, illustrating when the impingement is in the rear part of ovoid, part of image passing free of baffle not shown.

Fig. 13 is a horizontal projection illustrating the paths of an image, when the impingement is in a point on the side of ovoid, showing the two parts of an image, the one whish passes over, and the other which is intercepted and reflected by the baffle plate.

Fig. 14 is a perspective view illustrating the paths of the two portions of the image shown in Fig. 13, showing their separate projection by the ultimate cylindrical reflector.

Fig. 15 is a horizontal projection of the paths of an image, when the impingement is on the central portion of ovoid, showing the portion of image which passes over, and that which is intercepted and reflected by the baffle plate.

Fig. 16 is a perspective view illustrating the paths of the two portions of the image shown in Fig. 15, showing their separate impingement on and their projection by the ultimate cylindrical reflector.

Fig. 17 is a view similar to Fig. 11, illustrating by intermediate and ultimate graphs in percentage the vertical intensity of the light flux of the longitudinal split image as depicted in Figs. 15 and 16.

Fig. 18 is a graph illustrating the Lambert cosine law of intensity in percentage, as applied to a single coil of the helix filament, showing the maximum intensity is on the line of split.

Referring to the drawings, Figs. 1 to 4 disclose one embodiment of the invention. Essentially the organization comprises an elongated light source diagrammatically illustrated at 7 in Fig. 3, a hemispherical reflector 8 associated therewith and beneath said light source, a light shield or baffle plate 22, and ovoid reflector 25 above the light source and supported on said shield, a trough-like reflector 21 disposed beneath the aforementioned elements and a connecting member 24 for uniting reflectors 25 and 21. Side members S are employed to complete the opaque enclosure. As portrayed in our prior application, a non-reflector band or strip 50 is disposed across the lower limits of reflector 21.

The individual attributes of the various elements may be more evident upon reference to Figs. 1 to 4 and 5. The ultimate reflector 21 is provided as a trough-like member having preferably the shape of a parabolical cylindrical surface, so positioned as to be beneath a horizontal plane containing its axes 3, and its focal line 23, the element 22 of Fig. 1 is a plane opaque baffle plate or light shield positioned above the said horizontal plane, being inclined thereto an amount sufficient to accommodate the emplacement of hemispherical reflector 8, which is mounted in aperture 9 in said plate and depending therebeneath as shown in Fig. 3, the lowermost limit of plate 22 defines a sharp straight line trimming edge coincident with or closely adjacent to the focal line 23 of the ultimate reflector 21.

The light source 7 has been diagrammatically illustrated throughout the views. It is a straight line filament helix of relatively small diameter being elongated and locused transversely and approximately parallel to the focal line 23 of the ultimate reflector.

Referring now to the superposed ovoid reflector; Fig. 5 shows the manner in which one half of the elliptical parabolic reflector 25 is generated. This reflector comprises an ovoid surface locused on one side of the horizontal plane, Fig. 3 and includes two halves, but one of which is illustrated in Fig. 5. Each half comprises the geometrical figure of one specie of warped surface having a horizontal plane director, which surface is generated by a constantly diminishing ellipse 4. The three directrices 26, 27 and 28 lie in the directer plane and intersect at a common point 36. The two outer directrices 26 and 27 are arcs of parabolas having a common focus resting on the proximate focus 6 of the primitive generating ellipse 1 with their vertices on the opposite sides of a common ordinate 28, and resting on the vertices of the primitive generating ellipse 1. This common ordinate is the middle right line directrix locused perpendicular to the common axis 2' of the parabolas through the remote focus 13 of the primitive generating ellipse 1.

The axis 10 of the diminishing generatrix 4 is moved in the plane directer constantly parallel to the axis 2 of the primitive generating ellipse 1, with the diminishing ellipses vertices resting on the outer directrices 26 and 27, and their remote foci 13' resting on the right line common ordinate 28. The other half of the ovoid reflector is generated in a similar manner, the primitive generating ellipse having a proximate focus designated 5 in Fig. 2.

In assembled relation, the two halves A and B, Fig. 2, comprising the elliptical parabolic ovoid reflector 25, are superposed on the baffle plate 22, so that the foci 5 and 6 rest on the far ends of the light source 7 with the line of remote foci comprising foci 13, see Fig. 5, substantially coincident with focal line 23, see Fig. 3, and therefore parallel to said light source. In thus positioning the halves comprising the ovoid reflector 25 the axis 2 and "a" of the primitive generating ellipse for the one half A is locused within the other half B and parallel to the axis 2 and "b", and the proximate focus of each half locused on the far ends of the light source, thus the light source is between the two proximate foci 5 and 6. This relation of the foci causes substantially all rays, not of focal origin, impinging any portion of the ovoid 25 to be reflected beyond its line of remote foci.

In Figs. 2 and 3, a section or zone of the ovoid reflector 25 has been removed to more clearly illustrate the relation of parts. In those figures, it is manifest, that the ordinate 28 containing foci 13 of Fig. 5 coincides substantially with focal line 23 of Fig. 3, so that a portion of the reflector 25 projects beyond the image trimming edge of plate 22, forming therewith an outlet for rays to reflector 21. The association of the elements is shown graphically in Fig. 4.

In use, rays emitted downwardly by source 7, are reflected convergingly upward through the region of the light source by the hemispherical auxiliary reflector 8, so as to impinge ovoid reflector 25. Rays emitted upwardly impinge said reflector also and are reflected so as to pass over the edge of the baffle plate 22, at or to the rear of focal line 23. Due to the character and location of this reflector 25, the rays of focal origin emitted divergently from the light source, impinge the reflector and are reflected convergingly in parallel vertical planes to a single horizontal line, while all rays, other than of focal origin, are reflected substantially to and on one side only of said single horizontal line. Accordingly, this arrangement combined with plate 22 as described, causes images of the light source to pass over the edge of said plate to reflector 21 in such a manner that no rays can reach said reflector without passing on one side only of the ray-trimming edge of the plate, whence the rays are projected by reflector 21 only in and beneath a horizontal direction.

In Fig. 1, a ray 31 passing over the baffle plate edge and through the focal line 23 to impinge the cylindrical reflector 21, is projected forward in a horizontal plane. A ray 32, passing rearward of focal line 23, and impinging the same point of surface 21, is projected downwardly and forwardly in a plane beneath the horizontal.

In Fig. 3, a ray of light 33, origin at the proximate focus 5, and impinging any point, as at 14, of that side of the ovoid 25 which has 5 as its proximate focus, is reflected adjacent to the trimming edge of the baffle plate, and is projected by the ultimate reflector 21 in a horizontal plane and parallel to axis 3. A ray, 34, origin at the extreme other end 6 of the light source 7, and impinging the same point 14 is reflected to the right of the focal ray projection in a downwardly direction. The whole image 35 of the light source 7 passes over the baffle plate as a straight line having the end which originated at the proximate focus trimmed horizontally thereby. Accordingly, a composite beam of highly concentrated light is projected to a roadway in and beneath a horizontal direction without producing glare, having the limit of the upward extent of the beam accurately and sharply defined.

When it is required to meet a changed specific vertical distribution of the intensity, we employ a hyperbola, or a plurality of arcs of open conic sections for the directrix of the ultimate reflector 21, whereby a selected quantity of the rays are projected to the near and to the intermediate parts of the roadway.

Referring to the embodiment illustrated in Figs. 6, 7, 8, and 9, the general construction and arrangement are substantially similar to those of the prior figures, with the exception that the elements are inverted. In this type the ultimate cylindrical reflector 41 is positioned above the horizontal plane. The baffle plate 42 extends rearwardly from the focal line 43 of the ultimate reflector 41 to the reflector's line of vertices.

The opaque connecting member 44 inclines upwardly toward the focal line 43 of the ultimate reflector 41. The hemispherical auxiliary reflector 8 superposes the connecting member 44, being mounted in an orifice 9 of said member, in which is also positioned the light source 7, parallel to the line of foci 43 of the cylindrical reflector.

The elliptical parabolic ovoid reflector 45 subposes the connecting member 44, having the line of remote foci substantially coincident with the focal line 43 of the ultimate reflector 41. The axes of the ovoid reflector rest in the plane of connecting member 44.

The proximate focus 6, see Fig. 5, of the primitive generating ellipse 1 of one half of the ovoid surface is separated away from the proximate focus 5, see Fig. 7, of the other half, with the light source positioned between them, having the near ends of the light source 7 resting on the proximate foci 5 and 6. Accordingly, the axes of the primitive generating ellipses do not overlap as in the form first described.

While the halves A' and B' of this reflector 45 are formed in the same manner as employed for reflector 25, Fig. 3, i. e. in the manner disclosed in Fig. 5, they are assembled so that the planes containing the axes 2 do not overlap. Accordingly, the axis 2 of the half A' designated "a'" in Fig. 7, and the axis 2 of the half B', designated "b'" are on the near ends of the light source. Thus the light source is again wholly between the foci 5 and 6, but in a different manner than in the embodiment first described. Hence, each half of the reflector 45 has its own focus locused, a distance equal to one-half the length of the light source, within its own half. This relation of the foci causes all rays, not of focal origin, impinging any portion of the ovoid 45, to be reflected within its line of remote foci.

A rearward portion 12, see Fig. 9, of the ovoid surface 45, is rendered non-reflective to destroy certain rays which otherwise would be projected adversely. The association of the elements is shown graphically in Fig. 9.

In this inverted type, when it is required to meet a changed vertical distribution of intensity, we may employ an ellipse, or a compound ellipse for the directrix of the cylindrical surface 41.

In Fig. 6, a ray 51 passing over the baffle plate edge and through the focal line 43 to impinge the cylindrical reflector 41, is projected forwardly in a horizontal plane. A ray 52 passing forwardly of line 43, and impinging the same point of surface 41 is projected forwardly and downwardly in a plane beneath the horizontal. In this inverted type, therefore, the rays reach the reflector 41 at or in advance of focal line 43.

In Fig. 8, the rays 53 and 54 are the projections of the focal origin ray and the extreme ray impinging on the same point 14 of the ovoid reflector, having the straight line image 55 between them. The mode of operation, functions and results, of this embodiment are substantially similar to those of the combination described in Fig. 3.

It is understood that in obtaining the continuous whole ovoid of the overlapping foci type, we employ slightly less for each half than is shown in the structure illustrated in Fig. 5, while for each half of the separated foci type, we obtain the continuous surface by employing slightly more of the structure than is shown in said figure.

With special reference to the function of the improved baffle plate, we accomplish the objects by making the upper surface of the baffle plate reflective in the region of the trimming edge, as shown in Fig. 10, in which 11 is the reflective upper surface.

It is well known that when a utility size light source is installed at the proximate focus of an elliptical surface that every minute portion of the surface impinged reflects an image of the light source, the focal origin portion of the image to the remote focus, and the other portion of the image to the region of the remote focus, and that the composite beam is composed of the total of these individual images.

In our prior application, of which this is a continuation in part, the whole of the upper surface of the baffle plate, or shield, was made non-reflective, resulting in a loss, or great diminution of that part of the image which was trimmed off at the remote focal line of the ovoid reflector.

As shown in Fig. 12, by our new and improved baffle plate, the trimmage from those images reflected from that part of the ovoid posterior to the transverse focal ordinate plane through the proximate focus is re-reflected to the ovoid and gyrated to exit beyond the baffle plate edge.

Those images reflected from that part of the surface anterior to said focal ordinate plane have that part of the image which is intercepted by the baffle plate reflected to impinge the ultimate reflector as coming from above the line of foci of the ultimate reflector; the part of image which is immediately adjacent to the line of split, impinges the ultimate reflector as if coming from substantially the focus of the reflector; and the balance of the trimmage as if coming from rearward of the focus with a loss of intensity of only one added glance reflection, thereby adding both parts of the image to the field of illumination at approximately the same place; that is, the image, in its passage, from one reflector to the other is split into two parts and the intercepted part is doubled, like a hinge, over into substantially the path of the non-intercepted part, pivoting on the line of split, as shown in Fig. 11.

Whereby the baffle plate trims off in a horizontal line the end of image originating at the proximate focus without any corresponding loss of efficiency by loss of the part trimmed off, thereby substantially doubling the intensity of the rays projected horizontally by the ultimate reflector.

As shown in Figs. 15 and 16, by our new and improved baffle plate, the horizontal image of a horizontal elongated light source, which image is reflected from the central portion of the ovoid, is split lengthwise, in the line of the image's maximum intensity when desired, according to Lambert's cosine law, see Fig. 18, and projected by the ultimate reflector with the part contiguous to the line of split as the uppermost sheet, see Fig. 17.

Whereby theoretical accuracy in the structure, correlation, or placement of the elements in all parts of the apparatus prior to the baffle plate edge and ultimate reflector is not required, the changed result from any such cause being in the vertical distribution on the roadway, beneath the horizontal.

Whereby the improved baffle can be associated with any form of preparatory reflector which focalizes its images to the region of a horizontal line, yet the baffle causes the whole conical flux of each image to pass on the one side of said line; and whereby any concentrated light source regardless of the shape of the filament, can be installed in the region of the proximate focus, without causing an interference of efficiency.

In Fig. 10, is illustrated the improved baffle plate element 22, in which 23 is the trimming edge, and 11 the reflective portion. As shown in Fig. 1 it is a plane opaque baffle plate, or light shield, positioned above a horizontal plane containing axes 3 with its trimming edge 23 contained in said plane, said baffle inclined to the horizontal at a dihedral angle sufficient to accommodate the emplacement of the hemispherical auxiliary reflector 8; and also a sufficient inclination to expose an area 16 of the upper surface of the lower ultimate reflector 21 large enough to receive the impingement of those reflections which glance from the reflective upper surface 11 of the baffle plate in the region of the trimming edge 23. Fig. 3 shows the improved baffle plate embodied in the complete apparatus.

Said baffle plate 22 having a straight line light trimming edge 23 lying in a horizontal plane containing axes 3 and parallel with and substantially contiguous to the line of foci of the ultimate reflector 21 and to the line of remote foci of an associated ovoid, above described.

The added functions which the improved baffle performs are illustrated in Figs. 11 to 18, wherein "c" of Fig. 11 denotes the passage of the non-intercepted part of an image over and beyond the trimming edge, and "c'" the path of the image into the field of illumination; "d" the part of image intercepted by the baffle and doubled over to impinge lower reflector and "d'" the path of the intercepted part of the image as projected into the field of illumination.

Fig. 12 illustrates the pathway of the trimmage part of an image reflected from any part of ovoid surface posterior to the focal ordinate plane, wherein "f" denotes the part of image intercepted by the reflective part of the baffle plate and its gyration in the preparatory surface, and "f'" the final path of the intercepted part into the field of illumination.

The oblique images, as "n—m", in Fig. 13, in their passage over the baffle plate, are split by the trimming edge 23 in a horizontal line, which is contiguous to the line of foci of the ultimate reflector 21, Fig. 13.

The part "m" of the image intercepted by the reflective surface 11 of baffle, is glanced off to impinge at "m'" on the area 16 of parabolic cylinder 21, Fig. 14, from whence it is projected, having the uppermost sheet "m''" of the image in the horizontal; and the balance of the image beneath the horizontal. The other part "n" of the image having a free passage over edge 23 impinges ultimate reflector 21 as at "n'", Fig. 14, and is projected having its uppermost sheet "n''" also in the horizontal. It is obvious that in theory these two sheets m' and n' are in parallel planes not exceeding one inch apart.

The parallel parts of image, as "c" and "d" in Figs. 15 and 16, are split longitudinally in a horizontal line. The part "d", Fig. 15, which is glanced off the baffle, impinges ultimate reflector 21, Fig. 16, at "d'", parallel with the line of foci of the parabolic cylindrical reflector, and is projected in transverse sheets "d''", having the uppermost sheet in the horizontal. The other part "c" of image, in its free passage, impinges the ultimate reflector at "c'", Fig. 16, and is projected, having its upper sheet also in the horizontal, and the balance "c'''" of the image in transverse declining planes.

It is obvious that two adjacent sheets of the conical intensity or radiated light flux, are separated by the horizontal trimming edge of the baffle, and both projected in horizontal planes approximately adjacent to each other.

When, as shown in Fig. 15, an elongated horizontal light source 7 is installed, and the impingement is in the central portion of the ovoid, having the axis of the filament helix parallel with the remote foci line of ovoid, and the trimming edge 23 of the baffle plate coincide with the line of remote foci, it is evident that the vertical sectional intensity is projected by the ultimate reflector in a distribution in accordance with Lambert's cosine law, see vertical distribution curve, Fig. 18, in which "o—p" is one half of a single coil of the filament helix 7, and "o'—p'" the vertical distribution curve; "o''" the portion intercepted by the part 11 of the baffle and reflected, and "p''" the portion passing free of the baffle.

As shown by the law as demonstrated in Fig. 18, the maximum intensity of 100% is at the 90 degree angle, on the line of split of image, and the minimum at a 10 degree angle, being but 17% of the intensity, the graph being represented by the curved lines w and w'.

As applied in Fig. 17, "o'''" and "p'''" show intermediate graphs of the vertical distribution curve, and "o''''" and "p''''" the said graph's projection into the field of illumination, wherein the vertical distribution intensity curve is shown in "o''''" as of 100% horizontal and 17% downwardly.

Various modifications and arrangement of the parts, shape of the light source, and change to a downwardly direction of either portion of the split image may be adopted without departing from the scope and purview of the invention.

We claim:

1. In combination with a baffle plate having a straight line light trimming edge, a light source forward of said trimming edge, an ovoid reflector of conic section double curvature on one side of a plane containing said baffle plate, each side of said ovoid reflector comprising a warped surface composed of an infinite series of parallel consecutively diminishing ellipses having the parallel axes of each half resting in a common plane, and having the proximate focus of the primitive generating ellipse for each half resting in the light source and the remote foci of all the diminishing ellipses resting on a common straight line substantially parallel with and closely adjacent to the said straight line trimming edge, and a cylindrical reflector having an arc of a conic section in vertical section and a straight line in horizontal section, said cylindrical reflector being positioned on one side of a horizontal plane containing the axis of its directrix, and having the light source positioned on the other side of said horizontal plane, said reflector having its line of foci substantially coincident with the line of remote foci of the ovoid reflector.

2. In combination with a baffle plate inclined downwardly to a horizontal plane, said baffle plate having a rear straight line light trimming edge, a rectilinear light source forward of and parallel with said trimming edge, an ovoid reflector of elliptical parabolic double curvature superposed on said baffle plate, each side of said ovoid reflector comprising a warped surface composed of an infinite series of parallel diminishing ellipses having the proximate focus of the primitive generating ellipse for each half locused within the other half in the far end of the light source, and the remote foci of all the diminishing ellipses resting on a common straight line parallel with and closely adjacent to the said trimming edge, and a parabolic cylindrical reflector positioned beneath a horizontal plane containing the axis of its directrix, said cylindrical reflector having its focal line parallel with and closely adjacent to the said trimming edge.

3. In combination with a baffle plate having a rear straight line trimming edge, a light source forward of and above said trimming edge, an ovoid reflector of elliptical parabolic double curvature superposed on said baffle plate, each side of said ovoid reflector comprising a warped surface composed of an infinite series of parallel consecutively diminishing ellipses having the proximate focus of the primitive generating ellipse of each side resting in the light source, and the remote foci of all the diminishing ellipses in a common straight line parallel with and closely adjacent to said trimming edge of the baffle plate, and a cylindrical reflector whose directrix is an arc of a conic section, said cylindrical reflector positioned opposite the ovoid reflector on the lower side of a horizontal plane containing the focal line of said cylindrical reflector, and having the said focal line substantially coincident with the line of foci of the said ovoid reflector.

4. In combination with a baffle plate having a horizontal straight line light trimming edge at the front, a transversely rectilinear light source forward of said trimming edge, an ovoid reflector beneath the plane of the baffle plate inclined upwardly toward said trimming edge, each side of said ovoid reflector comprising a warped surface composed of an infinite series of parallel diminishing ellipses having their parallel axes in a common plane, and having the proximate focus of the primitive generating ellipse of each side separated away from each other and locused in the near end of the light source, and the remote foci of all the diminishing ellipses resting in a common straight line substantially parallel with the closely adjacent to the said trimming edge, and a cylindrical reflector positioned above a horizontal plane containing the axis of its directrix, having its line of foci parallel with and closely adjacent to said trimming edge and substantially coincident with the line of remote foci of the ovoid reflector.

5. A light projector comprising a focalizing cylindrical reflector positioned above a horizontal plane containing its focal line, a plane baffle plate positioned beneath said reflector and extending forwardly from the line of vertices of said reflector and having a front straight line light trimming edge, said edge terminating substantially parallel with and closely adjacent to the focal line of the reflector, a light source positioned forward of and below said reflector and its line, and reflector means extending from in front of the light source to the lower edge of the cylindrical reflector to compel substantially all the rays from the light source to converge toward said cylindrical reflector and to cause rays of light to reach said cylindrical reflector by crossing through or in front of its straight focal line, but not in the rear thereof.

6. In combination with a baffle plate inclined downwardly to a horizontal plane, said baffle plate having a rear straight line light trimming edge, a rectilinear light source forward of and parallel with said trimming edge, an ovoid reflector of elliptical parabolic double curvature superposed on said baffle plate, each side of said ovoid reflector comprising a warped surface composed of an infinite series of parallel diminishing ellipses having the proximate focus of the primitive generating ellipse for each half locused within the other half in the far ends of the light source, and the remote foci of all the diminishing ellipses resting on a common straight line parallel with and closely adjacent to the said trimming edge, and a parabolic cylindrical reflector positioned beneath a horizontal plane containing the axis of the directrix, said cylindrical reflector having its focal line parallel with and closely adjacent to the said trimming edge, said baffle plate being reflective on its upper surface in the region of the trimming edge whereby that portion of the image of the light source trimmed off horizontally by the baffle plate is reflected to the cylindrical reflector by the baffle plate through and to the rear of the focal line of said cylindrical reflector.

7. A light projector comprising a focalizing cylindrical reflector positioned beneath a horizontal plane containing its focal line, a light source positioned above said plane, reflector means extending from the line of vertices of said cylindrical reflector to the vicinity of said light source and substantially surrounding said light source to compel the rays from the light source to converge to the region of the focal line of said cylindrical reflector, and a baffle plate having a horizontally extending light trimming edge, said baffle plate being reflective on its upper surface in the region of said trimming edge only, said edge positioned substantially parallel with and closely adjacent to the focal line of the said cylindrical reflector, said baffle plate having its other edge, remote from the light trimming edge face the light source and extend to the forward end of said reflector means, whereby the said baffle plate prevents any rays from passing to the said cylindrical reflector which after reflection by the said cylindrical reflector would pass out as glare rays, and whereby any part of an image of the light source reflected from a portion of said reflector means, impinging upon the reflective portion of the baffle plate in the region of the trimming edge, is trimmed off horizontally and is reflected by the baffle plate to the said cylindrical reflector and reflected by it into the field of illumination also without glare, and substantially in the path of the non-intercepted part of the image, thereby substantially doubling the intensity of the upper sheets of light.

In testimony whereof we affix our signatures.

HAROLD E. SMITH.
HARRY E. BUFFINGTON.